United States Patent [19]

Watanabe

[11] Patent Number: 5,272,691

[45] Date of Patent: Dec. 21, 1993

[54] METHOD FOR RECORDING AND REPRODUCING COMPRESSED DATA

[75] Inventor: Masahiro Watanabe, Sagamihara, Japan

[73] Assignee: Matsushita Electric Industrial Co., Ltd., Kadoma, Japan

[21] Appl. No.: 885,634

[22] Filed: May 19, 1992

[30] Foreign Application Priority Data

May 30, 1991 [JP] Japan .................. 3-127147
Jun. 10, 1991 [JP] Japan .................. 3-137643

[51] Int. Cl.⁵ ............................. G11B 5/09
[52] U.S. Cl. ............................. 369/124; 360/48; 369/59
[58] Field of Search ............. 369/124, 125, 59; 360/48

[56] References Cited

U.S. PATENT DOCUMENTS

| | | | |
|---|---|---|---|
| 4,734,901 | 3/1988 | Murakami | 360/48 |
| 4,831,465 | 5/1989 | Pinson | 360/48 |
| 5,150,262 | 9/1992 | Hosokawa et al. | 360/48 |
| 5,194,995 | 3/1993 | Severtson et al. | 360/48 |
| 5,200,864 | 4/1993 | Dunn et al. | 360/48 |
| 5,214,631 | 5/1993 | Maeda et al. | 369/124 |

Primary Examiner—Constantine Hannaher
Assistant Examiner—Drew A. Dunn
Attorney, Agent, or Firm—Spencer, Frank & Schneider

[57] ABSTRACT

Disclosed is a method for recording and reproducing compressed data on and from a recording medium, in which, when recording and reproducing compressed data compressed by a data compression factor n, the recording medium is divided into successive blocks, each thereof corresponding to a unit recording/reproducing time T, and, when the blocks are designated as D11, D12, ..., D1N, D21, D22, ..., D2N, ..., DM1, DM2, ..., DMN (where N is an integer smaller than n, and M is an integer), the compressed data are then recorded and reproduced in the order of D11, D21, DM1, D12, D22, ..., DM2, ..., D1N, D2N, ..., DMN, whereby the compressed data ca be recorded and reproduced without changing the structure of mechanical and control systems of a CD, a DAT, etc. used to record and reproduce ordinary data on and from the recording medium.

2 Claims, 3 Drawing Sheets

5,272,691

METHOD FOR RECORDING AND REPRODUCING COMPRESSED DATA

BACKGROUND OF THE INVENTION

This invention relates to a method for recording and reproducing a compressed data signal, especially an audio signal or a video signal, on and from a recording medium.

Each of a compact disk (CD) and a digital audio tape (DAT) is known as a recording medium for recording a digital audio signal.

It is an object of the present invention to provide a method for recording and reproducing such a compressed data signal on and from the CD or DAT, while maintaining a conventional data writing/reading speed (a conventional linear velocity at each individual position on the surface of a rotating disk in the case of a CD or a conventional tape travelling speed in the case of a DAT) unchanged, that is, without changing the structure of conventional recording and reproducing mechanical and control systems or without lowering a writing/reading speed to have a value inversely proportional to a data compression ratio or factor.

SUMMARY OF THE INVENTION

In the following description, a method according to the present invention will be described with reference to FIG. 1 which shows an example in which a CD is used as a recording medium and the data compression factor $n=N=4$ (where N is generally an integer smaller than n).

In this example, each of data areas corresponding to a CD playback time of $(n \times T)$ as shown in FIG. 1(a) is divided by the integer N (=4), as shown in FIG. 1(b), where T represents a unit recording/reproducing time.

FIG. 1(b) shows that data areas each corresponding to $(n/N) \times T = T$ in terms of CD playback time are obtained as a result of the above-mentioned division. These data areas will hereinafter be referred to as blocks and designated as shown below, respectively:

D11, D12, D13, D14
D21, D22, D23, D24
D31, D32, D33, D34
.
.
.

Then, compressed data corresponding to the playback time of $(n \times n/N) \times T = n \times T = 4T$ can be recorded in each of the data areas (the blocks) D11, D12, ....., D33, D34, Therefore, as shown in FIG. 1(c), if, in the record mode, compressed data are sequentially recorded on the disk in the order of:

D11, D21, D31, . . . , (: first pass)
D12, D22, D32, . . . , (: second pass)
D13, D23, D33, . . . , (: third pass)
D14, D24, D34, . . . , (: fourth pass), while maintaining the conventional linear velocity at each individual position on the rotating disk unchanged, and, if, in the playback mode, compressed data are read out in the same order as that in the record mode, as shown below:

D11, D21, D31, . . . , (: first pass)
D12, D22, D32, . . . , (: second pass)
D13, D23, D33, . . . , (: third pass)
D14, D24, D34, . . . , (: fourth pass), then, when the data are reproduced after the data have been expanded, the data in each block corresponds to the playback time of $n \times T$ (=4T), as shown in FIG. 1(d).

Suppose now, for example, a case where the operation of recording/reproduction of data in the first pass has been completed and the operation transfers to recording/reproduction of data in the second pass. In this case, the last block in the first pass is located near the outermost peripheral part of the data recording area of the disk, and the first block D12 in the second pass is located near the innermost peripheral part of the data recording area of the disk.

In order that the recording/reproducing operation may not be interrupted during an access period, an access operation should be completed while the last data read out in the first pass is being reproduced, that is, an access operation should be completed during the time of $(N-1) \times T = 3T$. In other words, the values of N and T should be chosen to satisfy the relation of $(N-1) \times T >$ the maximum value of an access time.

Thus, when the method of the present invention is applied to a CD so that the CD is formatted to be operable as described above, a desired function of reproduction of compressed data can be incorporated in a conventional CD player by merely adding a circuit of a relatively simple structure to the circuit of the conventional CD player without changing the disk rotational speed and without making a corresponding change in the disk control system. As a result of this meritorious effect, by recording compressed data on a conventional 8 cm CD, digital audio signals for a maximum play time of 80 min. can be reproduced.

It is apparent that, in addition to the application of the present invention to a CD, the present invention can be applied to recording and reproduction of digital audio and video data for other recording media such as a-DAT, a digital VTR, etc.

DESCRIPTION OF THE PREFERRED EMBODIMENT

A preferred embodiment of the method according to the present invention will now be described with reference to a case of storing compressed digital audio data on a block unit basis in place of digital audio data stored on an ordinary CD in the form in which the sampling frequency=44.1 kHz, the quantization bit number=16 bits, and the channel number=two channels (L/R).

Figure 1:
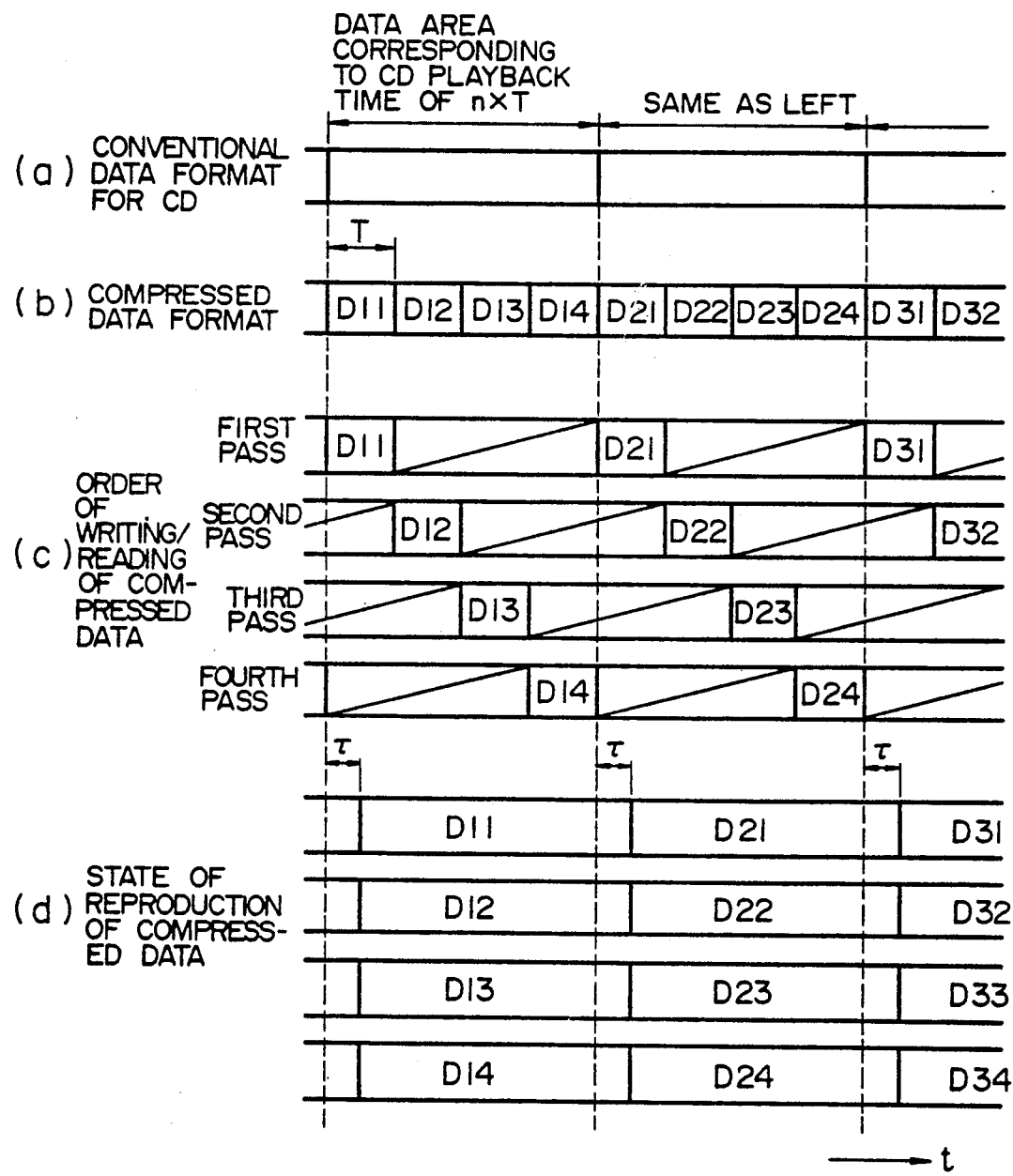
FIG. 1 is an explanatory drawing illustrating a format in an embodiment of the compressed data recording and reproducing method according to the present invention.
Figure 2:
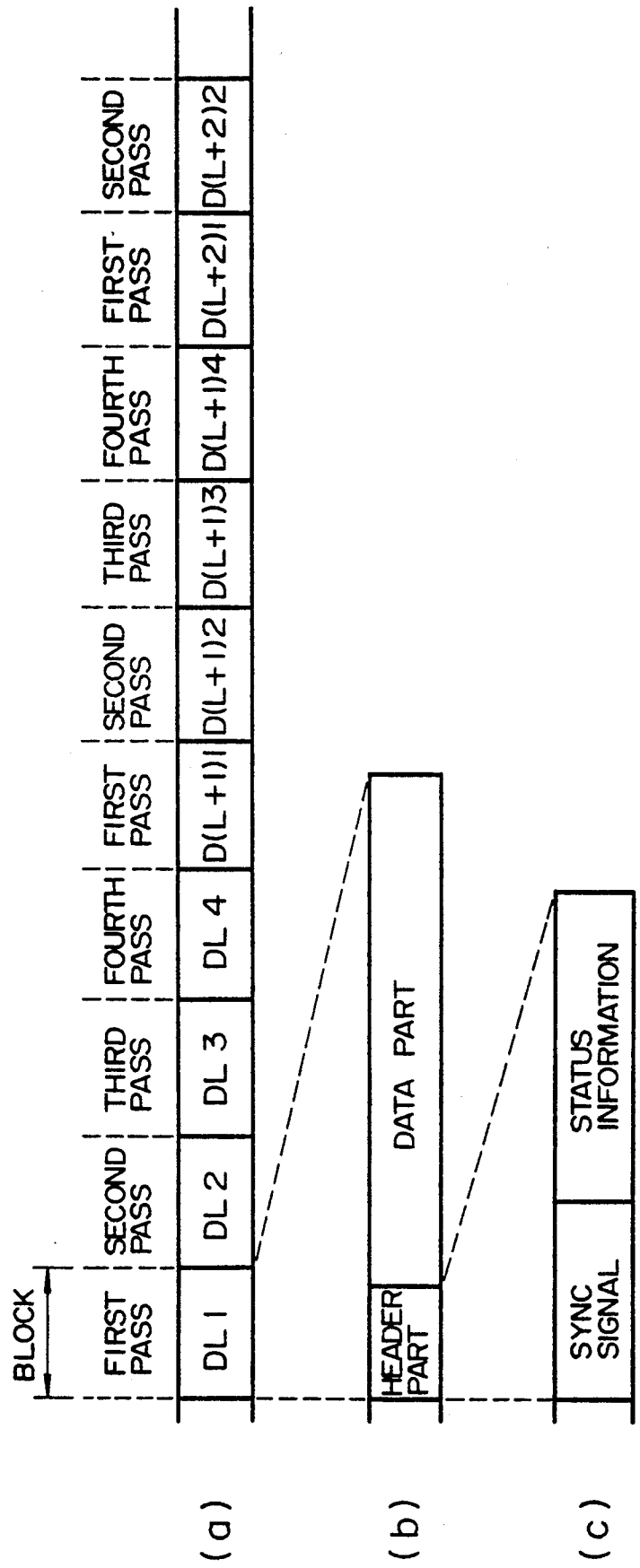
FIG. 2 illustrates a compressed data recording format in the embodiment shown in FIG. 1.

FIG. 2 shows an example of the arrangement of the compressed digital audio data. FIG. 2(a) shows a state where the compressed digital audio data are stored periodically in sequential blocks in the order of first pass data DL1, second pass data DL2, third pass data DL3, fourth pass data DL4, and so on. FIG. 2(b) shows that the data in each block shown in FIG. 2(a) are composed of a header part and a data part, and FIG. 2(c) shows that a header part shown in FIG. 2(b) is composed of a block synchronizing signal and a block status information (for example, the pass number, the block number in the same pass, etc.).

Figure 3:
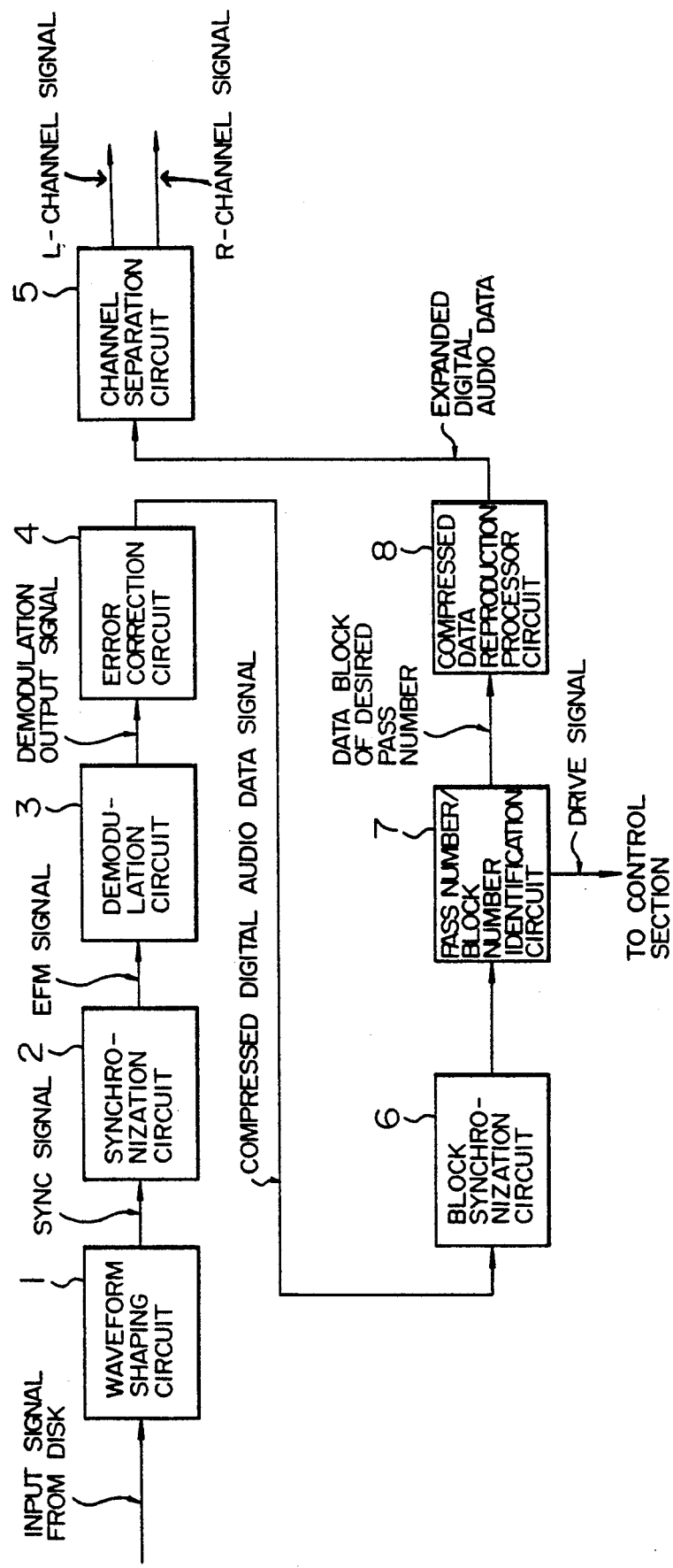
FIG. 3 shows an example of the structure of a signal processing section employed in the present invention.

FIG. 3 shows an example of the structure of a signal processing section of a CD employed in the present invention. Referring to FIG. 3, reference numeral 1 designates a waveform shaping circuit for converting an analog signal read out from a disk into a binary signal. Reference numeral 2 designates a synchronization circuit for extracting a synchronizing signal from an output signal of the waveform shaping circuit 1 and for outputting an EFM signal which is used to perform bit synchronization and frame synchronization. Reference numeral 3 designates a demodulation circuit for demodulating the EFM signal outputted from the synchronization circuit 2. Reference numeral 4 designates an error correction circuit for correcting any error contained in an output signal of the demodulation circuit 3 to thereby output a 16-bit digital audio data signal. Reference numeral 5 designates a channel separation circuit for separating an output signal of the error correction circuit 4 into two channel (L/R) signals when used in a conventional CD player. The above-described circuits generally compose a signal processing section of a conventional CD player.

The CD player according to the method of the present invention is featured in that circuits 6, 7 and 8 described below are added to the conventional signal processing section composed of the circuits 1, 2, 3, 4 and 5 described above. In FIG. 3, reference numeral 6 designates a block synchronization circuit which receives an output signal of the error correction circuit 4 and performs block synchronization of a compressed digital audio data signal. Reference numeral 7 designates a pass number/block number identification circuit for reading out a pass number and a block number from status information contained in an output signal of the block synchronization circuit 6 so as to supply only a data block of a desired pass number to a compressed data reproduction processor circuit 8 described later. When the read-out block number indicates that it is a last data block of the same pass number, the pass number/block number identification circuit 7 operates to add +1 to the pass number of the data block to be supplied to the compressed data reproduction processor circuit 8. (For example, when the pass number of the present data block is 2, a next pass number is set to 3.) At the same, a drive signal for shifting an optical pickup toward the innermost peripheral part of the data area of the CD is outputted from the pass number/block number identification circuit 7 to a control section (not shown) which controls the operation of the whole CD system. Reference numeral 8 designates the compressed data reproduction processor circuit, as described above, which operates to expand compressed data contained in one data block inputted thereto and to convert the compressed data into original digital audio data Supposing now that the maximum value of an access time is 2 sec, since $N=4$, the value of T is given by $(4-1) \times T > 2$, or $T > \frac{2}{3}$ sec, on the basis of the aforementioned relation $(N-1) \times T >$ the maximum value aforementioned of an access time. That is, the capacity of a memory in the compressed data reproduction processor circuit 8 is selected to have a value which is able to store audio data corresponding to a record time of $\frac{2}{3}$ sec for a conventional CD.

Claims:

1. A method for recording and reproducing compressed data compressed by a data compression factor n on and from a recording medium, comprising the steps of:

dividing the recording medium into successive blocks, each thereof corresponding to a unit recording/reproducing time T;

designating the $$
\begin{array}{l}
D11, D12, \ldots, D1N \\
D21, D22, \ldots, D2N \\
\ldots \\
\ldots \\
DM1, DM2, \ldots, DMN,
\end{array}
$$

where N is an integer smaller than n, and M is an integer; and recording and reproducing the compressed data on and from the recording medium in the order of:

$$
\begin{array}{l}
D11, D21, \ldots, DM1 \\
D12, D22, \ldots, DM2 \\
\ldots \\
\ldots \\
D1N, D2N, \ldots, DMN.
\end{array}
$$

2. A method for recording and reproducing compressed data according to claim 1, wherein the values of N and T are selected so as to satisfy the relation of $(N-1) \times T >$ the maximum value of an access time.

* * * * *